(12) United States Patent
Pinkelman et al.

(10) Patent No.: US 11,029,179 B2
(45) Date of Patent: Jun. 8, 2021

(54) SENSOR CALIBRATION ENCLOSURES AND METHODS OF USING SENSOR CALIBRATION ENCLOSURES TO CALIBRATE VEHICLE SENSORS

(71) Applicant: TOYOTA MOTOR ENGINEERING & MANUFACTURING NORTH AMERICA, INC., Plano, TX (US)

(72) Inventors: Brian J. Pinkelman, Ann Arbor, MI (US); Todd Muck, Fowlerville, MI (US); Danil Prokhorov, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 35 days.

(21) Appl. No.: 16/674,359

(22) Filed: Nov. 5, 2019

(65) Prior Publication Data

US 2021/0131838 A1    May 6, 2021

(51) Int. Cl.
*G01D 18/00* (2006.01)
*B60W 50/00* (2006.01)
*G05D 1/02* (2020.01)

(52) U.S. Cl.
CPC ............ *G01D 18/00* (2013.01); *B60W 50/00* (2013.01); *B60W 2050/0088* (2013.01); *G05D 1/021* (2013.01); *G05D 2201/0213* (2013.01)

(58) Field of Classification Search
CPC ............... G01D 18/00; B60W 50/00; B60W 2050/0088; G05D 1/021; G05D 2201/0213
See application file for complete search history.

(56) References Cited

U.S. PATENT DOCUMENTS

| | | | |
|---|---|---|---|
| 9,869,754 B1* | 1/2018 | Campbell | G01S 7/4865 |
| 9,933,515 B2 | 4/2018 | Prokhorov | |
| 10,785,474 B1* | 9/2020 | Semansky | G05D 1/0246 |
| 2012/0320190 A1* | 12/2012 | Natroshvili | G06T 7/85 348/135 |
| 2017/0343654 A1* | 11/2017 | Valois | G01S 17/931 |
| 2018/0081361 A1* | 3/2018 | Robinson | G01C 19/34 |
| 2018/0284243 A1 | 10/2018 | Wood | |
| 2019/0056483 A1* | 2/2019 | Bradley | G01S 7/4972 |
| 2019/0204425 A1 | 7/2019 | Abari et al. | |
| 2019/0204427 A1* | 7/2019 | Abari | G01S 17/931 |

FOREIGN PATENT DOCUMENTS

| | | |
|---|---|---|
| EP | 3001137 A1 | 3/2016 |
| KR | 20190045375 A | 5/2019 |
| WO | 2019079219 A1 | 4/2019 |

* cited by examiner

*Primary Examiner* — Gregory J Toatley, Jr.
*Assistant Examiner* — Lyudmila Zaykova-Feldman
(74) *Attorney, Agent, or Firm* — Dinsmore & Shohl LLP

(57) ABSTRACT

The present application relates to a calibration enclosure, systems that include a calibration enclosure, and methods of using the same. A calibration enclosure includes a body having an interior surface and one or more projections disposed at one or more locations on the interior surface of the body. Each one of the one or more projections provides an encoded signal that is usable for calibrating a vehicle sensor when the calibration enclosure is placed over a vehicle including the vehicle sensor such that the calibration enclosure covers the vehicle.

20 Claims, 8 Drawing Sheets

SENSOR CALIBRATION ENCLOSURES AND METHODS OF USING SENSOR CALIBRATION ENCLOSURES TO CALIBRATE VEHICLE SENSORS

BACKGROUND

Field

The present disclosure generally relates to systems that are used to calibrate vehicle sensors, and more specifically, to enclosures that include calibration projections on an interior surface thereof that are used for calibration when the enclosures are placed over a vehicle.

Technical Background

Vehicles, including autonomous vehicles and semi-autonomous vehicles, may have a plurality of sensors embedded therein or mounted thereon (e.g., embedded in or mounted on body panels, components, and/or the like) that occasionally may have to be removed for replacement, cleaning, and/or repair and subsequently reinstalled. Upon reinstallation, such sensors may require calibration to ensure proper operation. Some sensors that are not removed and subsequently reinstalled on the vehicle may also require periodic calibration to ensure proper operation. While systems and components exist for providing reference points, patterns, and/or the like for calibration, such systems and components are difficult to align with various different vehicles to ensure appropriate calibration, not adapted for more than one vehicle type or sensor type, and/or may be time consuming and/or difficult to use.

SUMMARY

In one aspect, a calibration enclosure includes a body having an interior surface and one or more projections disposed at one or more locations on the interior surface of the body. Each one of the one or more projections provides an encoded signal that is usable for calibrating a vehicle sensor when the calibration enclosure is placed over a vehicle including the vehicle sensor such that the calibration enclosure covers the vehicle.

In another aspect, a system for calibrating one or more vehicle sensors includes a calibration enclosure. The calibration enclosure includes one or more projections disposed at one or more locations on the calibration enclosure. Each one of the one or more projections provides an encoded signal that is usable for calibrating at least one of the one or more vehicle sensors when the calibration enclosure is placed over a vehicle comprising the one or more vehicle sensors such that the calibration enclosure covers the vehicle.

In yet another aspect, a method of calibrating at least one vehicle sensor disposed on a vehicle includes placing a calibration enclosure over the vehicle such that the calibration enclosure covers the vehicle and executing at least one calibration algorithm. The calibration enclosure includes an interior surface having one or more projections disposed at one or more locations on the interior surface, each one of the one or more projections providing an encoded signal that is usable for calibrating the at least one vehicle sensor. The at least one calibration algorithm uses data obtained from at least one of the one or more projections to calibrate the at least one vehicle sensor.

Additional features and advantages of the aspects described herein will be set forth in the detailed description which follows, and in part will be readily apparent to those skilled in the art from that description or recognized by practicing the aspects described herein, including the detailed description which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings illustrate the various aspects described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1A:
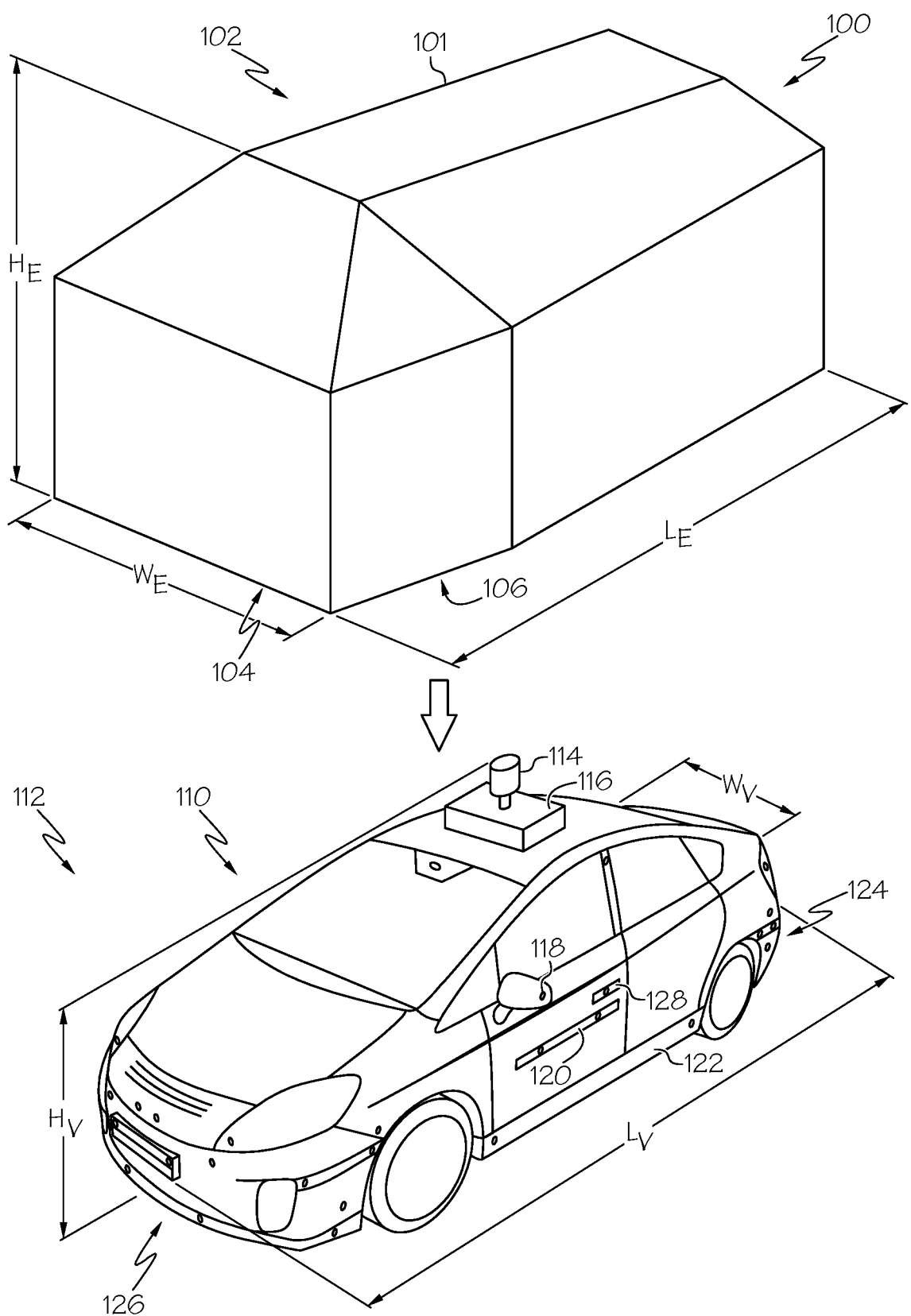
FIG. 1A schematically depicts an illustrative sensor calibration enclosure apparatus positioned over a vehicle according to one or more embodiments shown and described herein.
Figure 1B:
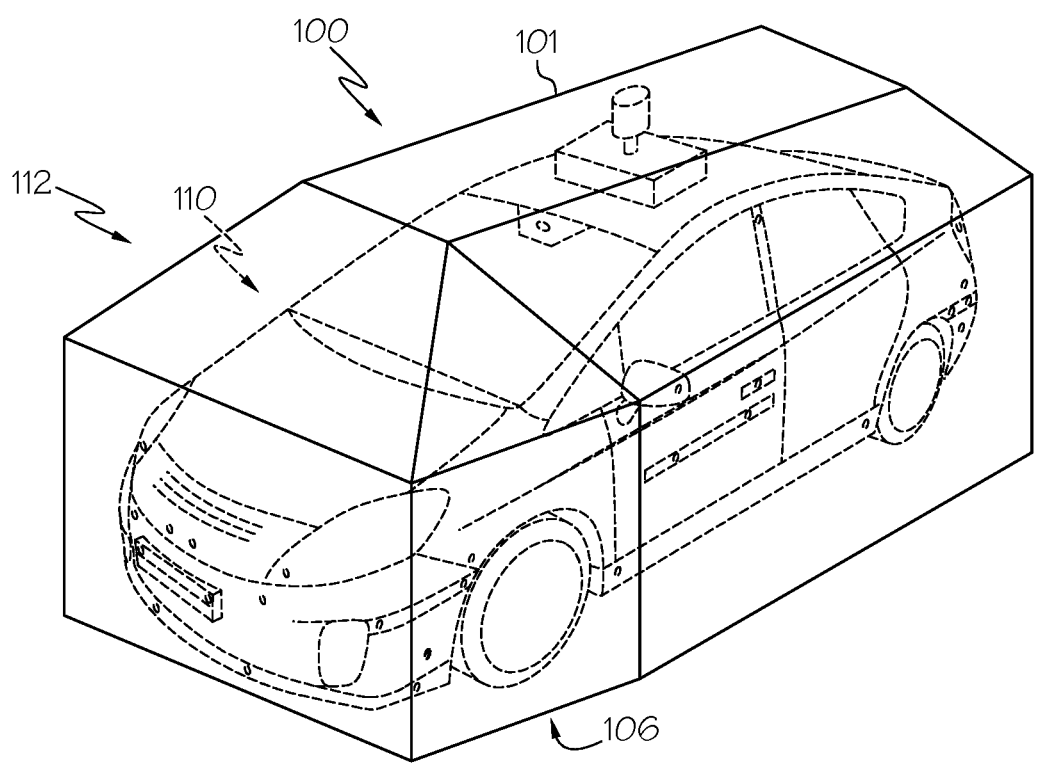
FIG. 1B depicts the sensor calibration enclosure of FIG. 1A covering the vehicle according to one or more embodiments shown and described herein.
Figure 2:
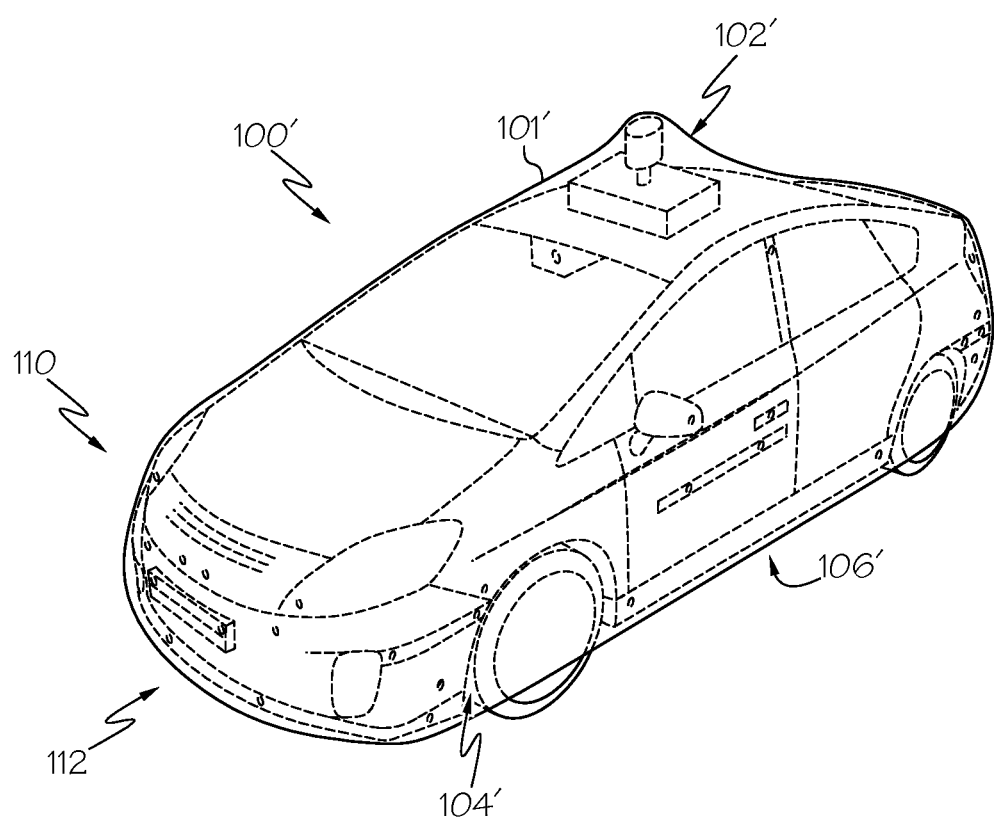
FIG. 2 schematically depicts another illustrative sensor calibration enclosure apparatus positioned over a vehicle according to one or more embodiments shown and described herein.

The present disclosure generally relates to an enclosure that includes an interior surface having one or more projections thereon, the one or more projections usable by one or more vehicle sensors for the purposes of calibration when the enclosure is placed over a vehicle and aligned with respect to the vehicle. The enclosures described herein may be hard enclosures constructed from a rigid material that does not conform to a shape of a vehicle as depicted in FIGS. 1A-1B, or may be soft enclosures constructed from a pliable material that conforms to a shape of a vehicle as depicted in FIG. 2. In some embodiments, the enclosures may be formed to correspond in shape and/or size of a particular vehicle. In other embodiments, the enclosures may be formed such that they fit over a vehicle in a certain manner, but do not necessarily correspond in shape and/or size of a particular vehicle.

When used, the enclosures described herein are generally aligned with a vehicle and/or one or more sensors positioned thereon or embedded therein by placing the enclosure over the vehicle such that the one or more sensors can use the one or more projections on the interior surface as a reference point when executing a calibration program. As such, a benefit is realized in that the one or more projections on the interior surface can be quickly aligned with the vehicle and/or the one or more sensors embedded therein or placed thereon. Another benefit is realized in that one or more sensors can be quickly calibrated for use, thereby reducing the amount of downtime typically associated with sensor replacement, cleaning, and/or repair.

Autonomous vehicles and semi-autonomous vehicles having advanced-feature functionalities (e.g., pre-collision avoidance functionality, lane departure alert/assist functionality, automatic high beam functionality, dynamic radar cruise control functionality, road sign assist functionality, lane tracing assist functionality, and/or the like) generally include one or more sensors, such as LiDAR sensors, radar sensors, imaging devices, light sensors, contact sensors, and/or the like. Such sensors provide data to one or more computing devices, which use the data to provide the autonomous or semi-autonomous capabilities in a vehicle. However, such sensors, due to various factors (e.g., external location on a vehicle that is subject to environmental exposure, existence of moving parts included with the sensors, existence consumable components included in the sensors, and/or the like), are subject to damage, wear and tear, misalignment, dirt and grime accumulation, and/or the like over the course of use. As such, there exists a need to remove the sensors from the vehicle, clean the sensors, repair the sensors, replace components within the sensors, replace the sensors, and/or the like. As a result, the sensors may become misaligned and/or no longer calibrated for use.

Conventionally, one or more datums may be precisely placed adjacent to the vehicle, the datums used for execution of a calibration algorithm. However, the precise placement of the datums is difficult to achieve and is time consuming to ensure adequate placement. Alternatively, the vehicle may be placed within a space, such as a room or the like, containing projections or the like that are used for the purposes of calibration. However, similar to the issues that arise with datums, alignment of the vehicle and/or the sensors thereof with the projections or the like in the space can be time consuming and difficult to achieve.

FIGS. 1A-1B depict an illustrative sensor calibration enclosure according to various aspects of the present disclosure. The sensor calibration enclosure depicted in the embodiment of FIGS. 1A-1B is a hard enclosure 100 that is positionable over a vehicle 110 having a plurality of sensors 112. More specifically, FIG. 1A depicts the hard enclosure 100 positioned above the vehicle 110, but not placed on the vehicle 110. In such a configuration, the hard enclosure 100 is off the vehicle 110 and generally may not be used for the purposes described herein, but may be placed over the vehicle 110 as depicted in FIG. 1B such that the hard enclosure 100 substantially covers or at least partially covers the vehicle 110. As such, the hard enclosure 100 may include a body 101 having an opening 106 on one end for easy placement over the vehicle 110. For example, the hard enclosure 100 depicted in FIGS. 1A and 1B has an opening 106 at a bottom surface of the body 101 such that the hard enclosure 100 can be lowered onto the vehicle 110, as indicated by the directional arrow depicted in FIG. 1A. While not shown in FIG. 1A, the hard enclosure 100 may include one or more attachment points or the like thereon, the attachment points being couplable to a raising and lowering mechanism, such as a hoist or the like, to raise and lower the hard enclosure 100 over the vehicle 110. In some embodiments, the hard enclosure 100 may be lightweight such that one or more users can pick up the hard enclosure 100 and place it over the vehicle 110 without the need for a raising and lowering mechanism, thereby facilitating the ease of use of the hard enclosure 100. It should be understood that the opening 106 at the bottom of the hard enclosure 100 is merely one illustrative example, and other openings are contemplated and included within the scope of the present disclosure. For example, the hard enclosure 100 may have a closable side opening in addition to or instead of the opening in the bottom of the hard enclosure 100 such that the hard enclosure 100 can be slid sideways onto the vehicle 110 or such that the vehicle 110 can be driven into the hard enclosure 100.

The body 101 of the hard enclosure 100 may generally be constructed of any type of material that provides a rigid structure as described herein. In some embodiments, the material may be sufficiently lightweight such that one or more users can lift the hard enclosure 100 and place it over the vehicle 110 with relative ease and/or without the use of machinery (e.g., a lift, a hoist, or the like). In some embodiments, the body 101 of the hard enclosure 100 may be formed of a plastic material, including, but not limited to, polyamide (PA), polycarbonate (PC), polyester (PES), polyethylene (PE), polypropylene (PP), polystyrene (PS), polyurethane (PU), polyvinyl chloride (PVC), acrylonitrile butadiene styrene (ABS), or the like. Specific embodiments of materials used for the body 101 of the hard enclosure 100 may include, but are not limited to, polyethylene terephthalate (PET or PETE), high-density polyethylene (HDPE), polyvinyl chloride (PVC), low-density polyethylene (LDPE), and/or the like. In some embodiments, such materials may allow for the hard enclosure 100 to be formed at a low cost for a specific type or class of vehicles so that a plurality of hard enclosures 100, each specifically shaped and sized for a particular vehicle or class of vehicles, is achievable. In other embodiments, the body 101 of the hard enclosure 100 may be formed of other materials such as fiberglass, glass-reinforced plastic, resins, clay, plaster, metals (e.g., steel, aluminum, or the like), compounds of any of the foregoing, composites of any of the foregoing, alloys, and/or the like. Other materials are contemplated and included within the scope of the present disclosure.

Referring to FIG. 1A, the body 101 of the hard enclosure 100 includes an exterior surface 102 and an interior surface 104, the interior surface 104 being a surface of the body 101 that faces the vehicle 110 when the hard enclosure 100 is placed over the vehicle 110. In some embodiments, the body 101 of the hard enclosure 100 is generally formed in a concave shape to define the interior surface 104 and the exterior surface 102 such that the inward curving surface of the concave shape is the interior surface 104 and the opposing surface is the exterior surface 102. In some embodiments, the body 101 of the hard enclosure 100 is generally formed of one or more sidewalls (e.g., a single side wall that extends around a circumference or a plurality of side walls that are connected together to define a circumference) and/or one or more top walls that are joined together to define a cavity whereby the interior surface 104 is on an inside of the cavity and the exterior surface 102 is on an outside of the cavity and opposing the interior surface 104.

In some aspects, the body 101 of the hard enclosure 100 is generally shaped and sized to correspond to the vehicle 110. That is, the body 101 of the hard enclosure 100 contains one or more dimensional aspects that generally correspond to one or more dimensional aspects of the vehicle 110. For example, an enclosure width $W_E$ generally corresponds to a vehicle width $W_V$, an enclosure height HE generally corresponds to a vehicle height $H_V$, and an enclosure length $L_E$ generally corresponds to a vehicle length $L_V$. Various other dimensional aspects of the body 101 of the hard enclosure 100 that allow the hard enclosure 100 to be placed over the vehicle 110 without hindrance may also be included, such as, for example, dimensional aspects that correspond to protuberances from the vehicle 110, such as side view mirrors, various ones of the sensors 112 that extend outwardly from the vehicle 110, a vehicle antenna, and/or the like.

As used herein, the term "corresponds" generally refers to dimensions that are approximately similar, but may not be an exact match. In some embodiments, "corresponds" may mean that the dimensional aspects of the body 101 of the hard enclosure 100 are larger than the dimensional aspects of the vehicle 110 such that the hard enclosure 100 can be easily placed over and removed from the vehicle 110 without difficulty, which may occur if the dimensional aspects of the vehicle 110 and the body 101 of the hard enclosure 100 were identical.

While FIGS. 1A and 1B depict a hard enclosure 100 that is generally shaped and sized to correspond to the shape and size of a particular vehicle 110, the present disclosure is not limited to such. That is, in some embodiments, the body 101 of the hard enclosure 100 may be dimensioned such that the hard enclosure 100 may be placed over a plurality of different vehicles such that it is not necessary to have specific enclosures for specific vehicles. More specifically, the body 101 of the hard enclosure 100 may be dimensioned such that it can be placed over a plurality of different vehicles, including different vehicles of the same class (e.g., mid-size type vehicles) and/or vehicles of different classes (e.g., a small vehicle, a full size vehicle, a minivan, an SUV, and/or a pickup truck).

As will be described in greater detail herein, the hard enclosure 100 is generally arrangable and positionable with respect to the vehicle 110 such that one or more projections located on the interior surface 104 of the body 101 of the hard enclosure 100 are in a predefined location with respect to the vehicle 110 and/or components thereof to facilitate calibration. In some embodiments, this may be achieved by the corresponding fit of the hard enclosure 100 to a particular vehicle described herein. That is, the body 101 of the hard enclosure 100 can only fit in one particular manner for one particular vehicle, which ensures precise arrangement. In other embodiments, the hard enclosure 100 may include one or more engagement features (not shown) that are particularly arranged and located to engage with one or more particular portions of the vehicle 110 to ensure that the body 101 of the hard enclosure 100 is particularly aligned with the vehicle 110 and/or components thereof. In yet other embodiments, the hard enclosure 100 may include one or more alignment features (not shown) that provide a user with an ability to visually ascertain whether the body 101 of the hard enclosure 100 is appropriately aligned with the vehicle 110 when the hard enclosure 100 is placed over the vehicle 110 (e.g., an indicator of alignment). For example, the hard enclosure 100 may include one or more images, lines, and/or the like thereon that a user uses to align with corresponding images, lines, vehicle components, and/or the like on the vehicle 110 when placing the hard enclosure 100 over the vehicle 110.

In some embodiments, the hard enclosure 100 may have features that allow the hard enclosure 100 to be stacked upon other enclosures when not in use to minimize the storage footprint of the enclosure. For example, the hard enclosure 100 may include a lip (not shown) extending around at least a portion of the body 101 thereof, the lip shaped and sized to contact and hold a portion of another enclosure, such as a bottom of another enclosure, when the other enclosure is stacked on top of the hard enclosure 100. Such a lip may facilitate easy stacking of a plurality of enclosures, particularly in embodiments where the hard enclosure 100 is shaped and/or sized for a particular type of vehicle and/or class of vehicle (e.g., because a plurality of different enclosures may be needed).

Referring to FIG. 1A, the vehicle 110 may include a plurality of vehicle body panels on which the plurality of sensors 112 may be placed, positioned, and/or integrated. For example, the plurality of vehicle body panels may include a first style of vehicle body panel including a front bumper cover, a rear bumper cover, a front fender, a rear quarter panel, a rocker panel, an air dam, and/or the like. The plurality of vehicle body panels may further include a second style of vehicle body panel including a side mirror housing, a headlight assembly, a taillight assembly, a windshield cowl, a grille, a door handle, and/or the like. The plurality of vehicle body panels may further include a third style of vehicle body panel including a license plate mount, a body side molding, a windshield assembly, a body panel add-on, a pillar (e.g., b-pillar) trim piece, and/or the like. As described herein, each vehicle body panel may include one or more of the plurality of sensors 112 that provide information that is used for autonomous and/or semi-autonomous driving.

Still referring to FIG. 1A, each of the plurality of sensors 112 of the vehicle 110 may be communicatively coupled (e.g., via a wired and/or wireless connection) with one or more control systems of the vehicle 110 (e.g., if equipped) or with a vehicle control unit of the vehicle 110. According to various aspects, each control system may be associated with a respective advanced-feature functionality of the vehicle 110 (e.g., autonomous or semi-autonomous features). According to aspects described herein, each control system may be configured to process signals and/or data received from one or more of the plurality of sensors 112 of the vehicle 110 and/or to communicate the signals and/or data to a vehicle control unit. According to various aspects, the vehicle control unit may include a power-train control module (PCM) which includes an engine control unit (ECU) and a transmission control unit (TCU).

Illustrative examples of sensors that may be included within the plurality of sensors 112 include, but are not limited to, a Light Detection and Ranging (LiDAR) unit 114 (e.g., a roof mounted LIDAR unit), one or more forward imaging devices 116 (e.g., a roof mounted imaging unit), one or more side mirror sensors 118 mounted on or integrated with the side mirrors of the vehicle 110, one or more door sensors 120 mounted on or integrated with a door panel of the vehicle 110, one or more trim panel sensors 122 mounted on or integrated with a vehicle trim panel, one or more rear bumper sensors 124 mounted on or integrated with a rear bumper of the vehicle 110, one or more front bumper sensors 126 mounted on or integrated with a front bumper of the vehicle 110, one or more handle sensors 128 mounted on or integrated with a door handle of the vehicle 110, and/or the like. Each of the sensors may be any type of sensor now known or later developed, including, but not limited to, a LiDAR sensor, a radar sensor, an imaging device, a contact sensor, a light sensor, and/or the like. Other examples of sensors may include, but are not limited to, a laser light emitter and/or an associated laser light receiver, a photodetector, a radio wave transmitter and/or an associated radio wave receiver, an imaging device (e.g., a complementary metal-oxide-semiconductor (CMOS) sensor), a microwave receiver, an ultrasound emitter and/or an associated ultrasound receiver, a global satellite positioning (GPS) radio, and the like. Still other examples of sensors may include, but are not limited to, a capacitive or touch sensor, a proximity sensor, a pressure sensor, a light sensor, a temperature sensor, an infrared sensor, a fingerprint sensor, a fingerprint or image recognition sensor, a fluid sensor, a displacement sensor, a fiber optic sensor, and the like. Other sensors not specifically described herein that provide data that is used for advanced feature functionality, particularly semi-autonomous or autonomous vehicle functionality, should be understood. At least one of the various sensors described herein may be calibrated using one or more projections located on the interior surface 104 of the hard enclosure 100, as described in greater detail herein.

FIG. 2 depicts another illustrative sensor calibration enclosure according to various aspects of the present disclosure. In the embodiment depicted in FIG. 2, the sensor calibration enclosure is a soft enclosure 100'. The soft enclosure 100' depicted in FIG. 2 is similar to that of the hard enclosure 100 depicted in FIG. 1A-1B in that it also includes a body 101' having an exterior surface 102' and an interior surface 104', the body 101' defining a cavity 106', where the interior surface includes one or more projections thereon, as described herein. However, the body 101' of the soft enclosure 100' depicted in FIG. 2 is constructed of a pliable material. The pliable material is generally not limited by this disclosure, and can be any material that is flexible and easily deformed. For example, the pliable material may be a fabric in some embodiments, including, but not limited to, plant based fabrics (e.g., fabrics made of grass, rush, hemp, and/or the like), mineral based fabrics (e.g., fabrics made of asbestos, basalt fiber, glass fiber, metal fiber, and/or the like), animal based fabrics (e.g., fabrics made of wool, silk, and/or the like), and/or synthetic based fabrics (e.g., fabrics made of polyester fiber, aramid fiber, acrylic fiber, nylon fiber, polyurethane fiber, carbon fiber, and/or the like). In particular embodiments, the body 101' of the soft enclosure 100' may be constructed of canvas, including coated canvas, or may be constructed as a woven polyethylene tarpaulin. It should be appreciated that the pliable material of the body 101' of the soft enclosure 100' allows for folding or otherwise reducing the overall footprint of the soft enclosure 100' when not in use (e.g., when storing the soft enclosure 100').

As described hereinabove with respect to the hard enclosure 100 of FIGS. 1A and 1B, the soft enclosure 100' of the embodiment in FIG. 2 may be shaped and sized to correspond to the vehicle 110 upon which it is placed such that the various sensors on the vehicle may sense the projections on the interior surface 104' thereof for the purposes of calibration. As such, the soft enclosure 100' may also have particular dimensional aspects that correspond to dimensional aspects of a particular vehicle, may have dimensional aspects that correspond to dimensional aspects of a particular class of vehicle, or may have dimensional aspects that correspond to a plurality of different types of vehicles. The soft enclosure 100' may further be shaped and sized such that, when particularly arranged over the vehicle 110, the projections located on the interior surface 104' thereof are in a particular location usable for the purposes of calibrating the various sensors located on the vehicle 110.

As will be described in greater detail herein, the soft enclosure 100' is generally arrangable and positionable with respect to the vehicle 110 such that one or more projections located on the interior surface 104' of the soft enclosure 100' are in a predefined location with respect to the vehicle 110 and/or components thereof to facilitate calibration. In some embodiments, this may be achieved by the corresponding fit of the body 101' of the soft enclosure 100' to a particular vehicle described herein. That is, the body 101' of the soft enclosure 100' can only fit in one particular manner for one particular vehicle in such embodiments, which ensures precise arrangement. In other embodiments, the soft enclosure 100' may include one or more engagement features (not shown) that are particularly arranged and located to engage with one or more particular portions of the vehicle 110 to ensure that the soft enclosure 100' is particularly aligned with the vehicle 110 and/or components thereof. In yet other embodiments, the soft enclosure 100' may include one or more alignment features (not shown) that provide a user with an ability to visually ascertain whether the soft enclosure 100' is appropriately aligned with the vehicle 110 when the soft enclosure 100' is placed over the vehicle 110. For example, the soft enclosure 100' may include one or more images, lines, and/or the like that a user uses to align with corresponding images, lines, vehicle components, and/or the like on the vehicle 110 when placing the soft enclosure 100' over the vehicle 110.

Figure 3A:
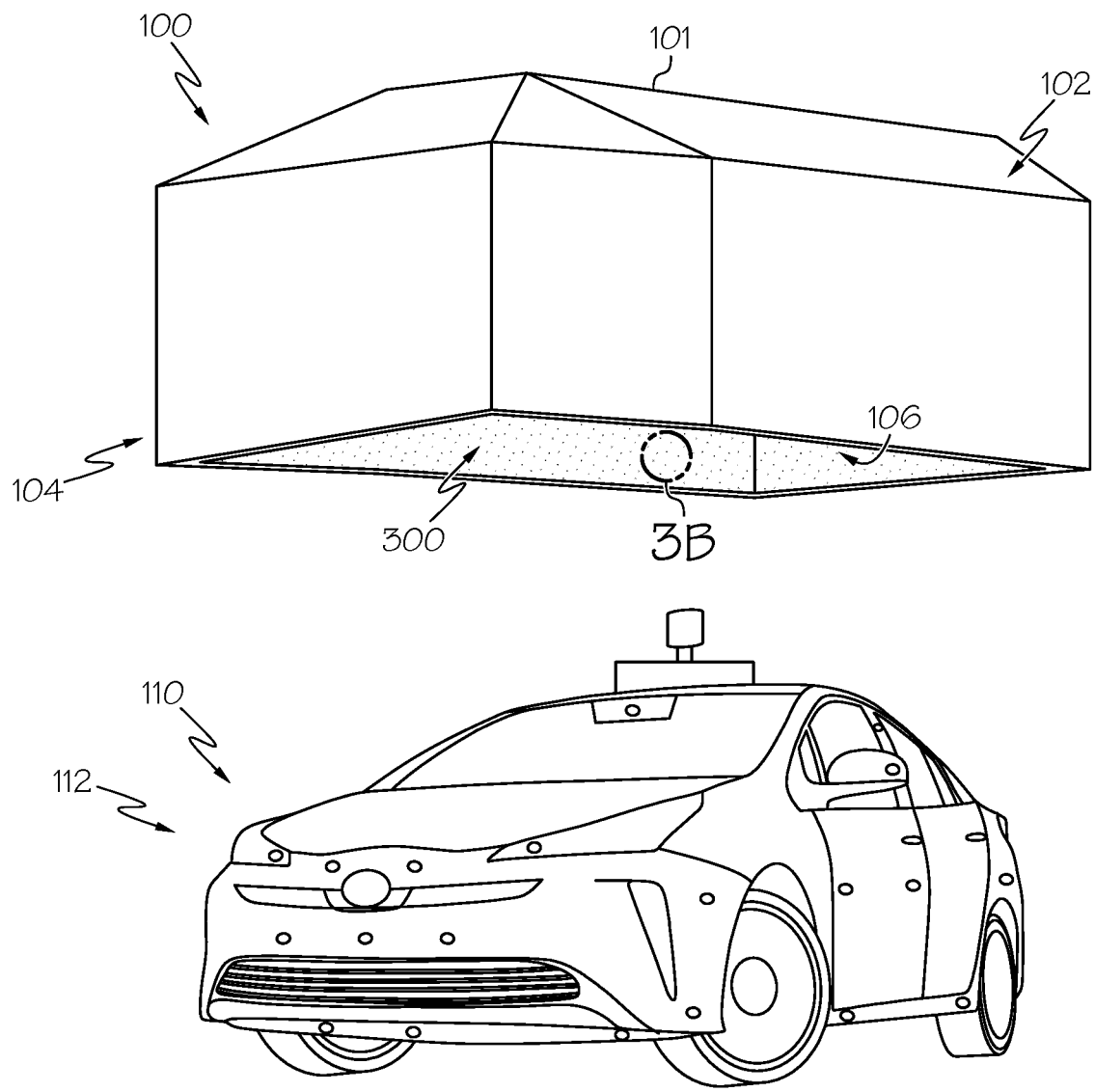
FIG. 3A schematically depicts an illustrative calibration projection located on an interior surface of a sensor calibration enclosure according to one or more embodiments shown and described herein.

FIG. 3A schematically depicts the hard enclosure 100 from a bottom up perspective, showing the cavity 106 and a portion of the interior surface 104 of the body 101 of according to some aspects. As shown in FIG. 3A, the interior surface 104 includes a projection 300 thereon. The projection 300 is generally any device, component, or the like that displays, emits, or otherwise provides an encoding that can be sensed by the one or more sensors 112 of the vehicle 110. While FIG. 3A generally depicts a visual pattern (e.g., a pattern that is usable by image sensors, LiDAR components, and/or the like), this is merely illustrative. That is, the projection 300 may be any pattern, encoded signal, and/or the like, including non-visual patterns, encoded signals, and/or the like, such as signals that are sensed by sensors such as sound sensors (e.g., sonar sensors), pressure sensors, radio wave sensors, and/or the like. For example, the projection 300 may be a device that broadcasts an encoded radio signal that is detectable by one or more of the sensors 112 and usable for calibration as described herein. That is, the projection 300 may be a radio-frequency identification (RFID) tag (including low frequency tags, high frequency tags, and ultra-high frequency tags), a near-field communication (NFC) tag, or the like. In another example, the projection 300 may emit a particular sound that is detectable by one or more of the sensors 112 and usable for calibration as described herein.

In some embodiments, the projection 300 may be located throughout the interior surface. That is, the projection 300 (or a plurality of projections 300) may be located on substantially all of the interior surface 104. In other embodiments, the projection 300 may only be located at particular locations on the interior surface 104 (e.g., locations that correspond to locations on the vehicle 110 where calibration is needed when the hard enclosure 100 is placed over the vehicle 110). In still yet other embodiments, the projection 300 may only be located at a single location on the interior surface 104. The projection 300 may be placed on the interior surface 104 in any manner. For example, the projection 300 may be printed on or otherwise applied to the interior surface 104 of the body 101, may be formed separately from the body 101 and attached to the interior surface 104 of the body 101 (e.g., a sticker or decal that is placed on the interior surface 104), may be formed with the body such that the projection 300 is displayed on the interior surface 104 after formation (e.g., a molding process for molding the body 101 whereby the projection 300 is molded as part of the molding process).

In some embodiments, the projection 300 may be a static projection that remains the same. For example, the projection 300 may be an image that is arranged on the interior surface 104 of the body 101 of the enclosure 100, 100'. In other embodiments, the projection 300 may be a dynamic projection that changes periodically, such as at particular intervals or when receiving a signal to change. For example, the enclosure 100, 100' (or component thereof, such as the projection 300 in embodiments where the projection 300 is a device that broadcasts a signal) can be communicatively coupled to a computing device (not shown) and/or the vehicle 110, where the computing device and/or the vehicle 110 transmit one or more signals that cause the projection 300 to change. Such signals may be transmitted according to a calibration algorithm, for example.

Figure 3B:
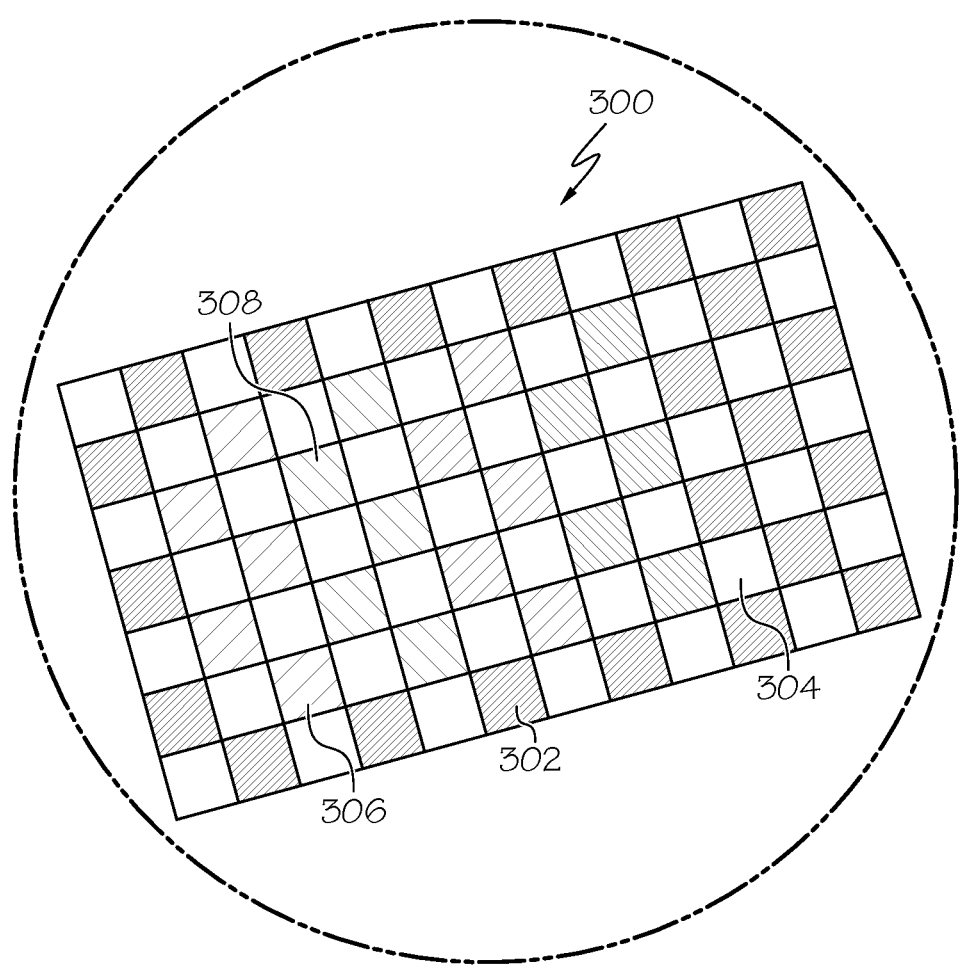
FIG. 3B schematically depicts a detailed view of the calibration projection of FIG. 3A.
Figure 4A:
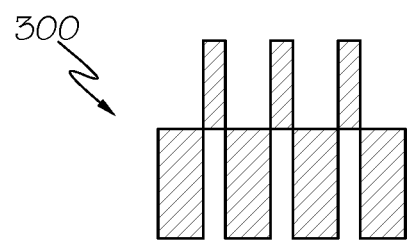
FIG. 4A depicts another illustrative calibration projection according to one or more embodiments shown and described herein.
Figure 4B:
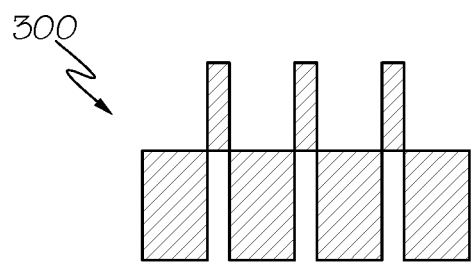
FIG. 4B depicts yet another illustrative calibration projection according to one or more embodiments shown and described herein.
Figure 4C:
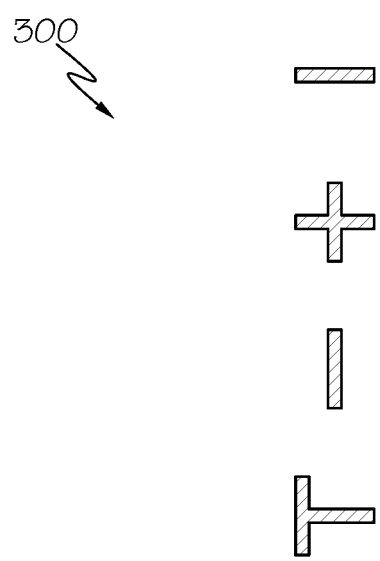
FIG. 4C depicts yet another illustrative calibration projection according to one or more embodiments shown and described herein.

FIG. 3B depicts a more detailed view of the projection 300 on the interior surface 104 shown in FIG. 3A. Referring to FIGS. 3A-3B, the projection 300 may include a plurality of shapes arranged in a particular manner that is recognizable by software algorithms for the purposes of calibration. In some embodiments, the projection 300 may be a plurality of squares arranged in an alternating light and dark pattern similar to that of a checkerboard, for example. In some embodiments, such as the embodiment depicted in FIG. 3B, the projection 300 may include a plurality of differently shaded shapes arranged in a particular manner (e.g., a grid-like formation), including a first shaded shape 302, a second shaded shape 304, a third shaded shape 306, and a fourth shaded shape 308. That is, each one of the various shaded shapes 302, 304, 306, 308 are generally a shade or color that is different relative to the other ones of the various shaded shapes 302, 304, 306, 308. While FIG. 3B depicts the shaded shapes 302, 304, 306, 308 each being the same shape (e.g., square) and size (e.g., 1 pixel×1 pixel), this is merely illustrative. For example, as shown in FIGS. 4A and 4B, the shapes of the projection 300 may be different. That is, FIGS. 4A and 4B both depict a first shape that is narrower than a second shape, but still arranged in a grid-like formation. In another example, as shown in FIG. 4C, the shapes of the projection 300 are not in a grid-like formation, but rather are distinct shapes (e.g., a horizontal line, a plus shape, a vertical line, and a t shape). Other shapes and arrangements are also contemplated and included within the scope of the present disclosure (e.g., bullseye shapes, bar codes/QR codes, images of particular objects, and/or the like).

Referring again to FIGS. 3A-3B, the particular arrangement of the shapes of the projection 300 (including the arrangement of particularly shaded shapes relative to one another) may be such that calibration algorithms can utilize the arrangement for the purposes of calibrating the plurality of sensors 112 on the vehicle 110 (FIG. 1A). For example, FIG. 3B depicts a grid-like pattern whereby the first shaded shape 302 and the second shaded shape 304 are located around a perimeter of the grid-like pattern, and the second shaded shape 304, the third shaded shape 306, and the fourth shaded shape 308 are located in an interior of the grid-like pattern such that the second shaded shape 304, the third shaded shape 306, and the fourth shaded shape 308 are surrounded by the perimeter of the first shaded shape 302 and the second shaded shape 304.

The calibration algorithms utilized for the purposes of calibrating the plurality of sensors 112 (FIG. 1A) are not limited by the present disclosure, and may be any algorithm now known or later developed. Such calibration algorithms are well understood and are not discussed in greater detail herein. The projection 300 may be generated for the purposes of using a particular calibration algorithm in some embodiments. Still referring to FIGS. 3A-3B, in some embodiments, the interior surface 104 may include a plurality of different projections such that the hard enclosure 100 is adapted for use with a plurality of different calibration algorithms (e.g., each one of the plurality of different projections is a particularly adapted projection for a particular one of the plurality of different calibration algorithms) and/or a plurality of different sensors 112. Further, the projection 300 may be modifiable such that the projection 300 is usable by any later developed calibration algorithm or subsequently used calibration algorithm. For example, the interior surface 104 can be painted or coated with a material to cover the projection 300 such that a new projection can be placed thereover. In another example, the projection 300 may be placed on the interior surface 104 with an erasable ink, a removable sticker or decal, and/or the like, which can be subsequently erased or removed (or moved/repositioned) if necessary.

While FIGS. 3A-3B specifically relate to the hard enclosure 100 depicted in the embodiment of FIGS. 1A and 1B, it should be understood that this is merely illustrative. That is, the soft enclosure 100' depicted in the embodiment of FIG. 2 may also include the projection 300 depicted in FIGS. 3A-3B.

Figure 5:
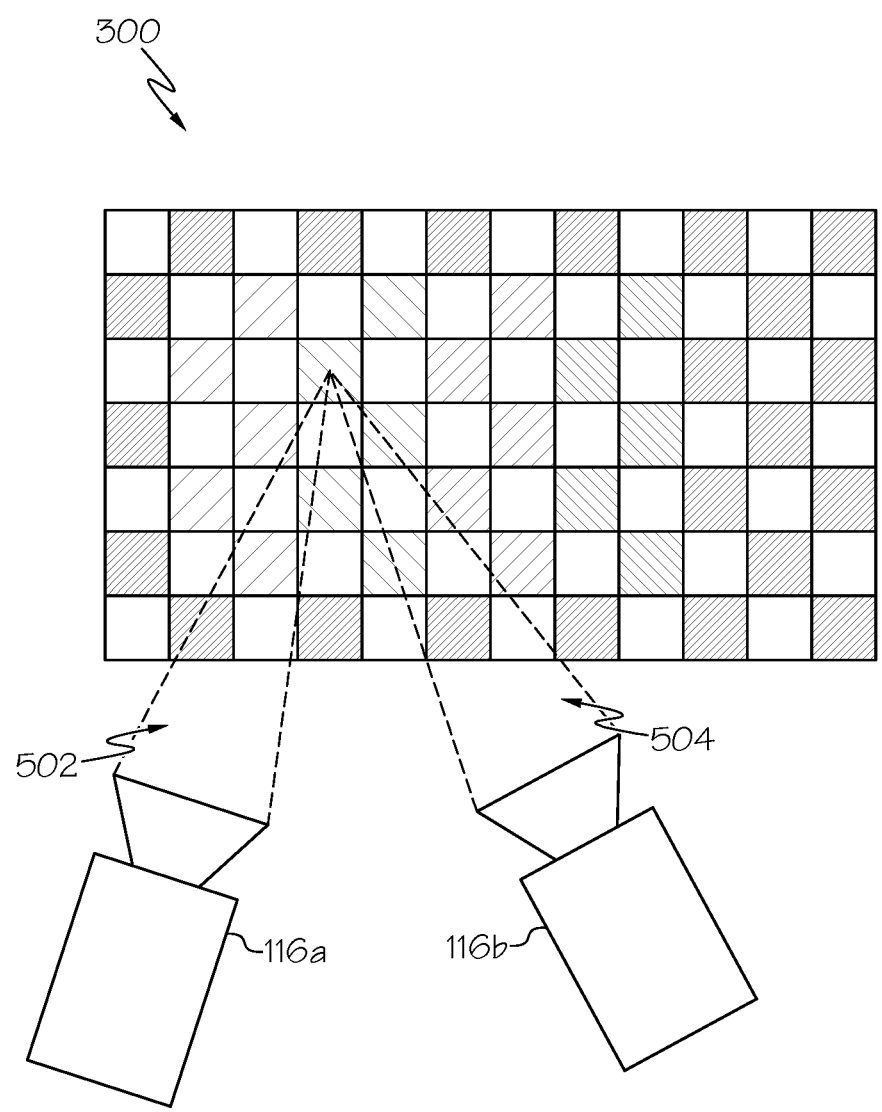
FIG. 5 schematically depicts use of a calibration projection to calibrate one or more sensors according to one or more embodiments shown and described herein.

FIG. 5 depicts the use of a first forward imaging device 116a and a second forward imaging device 116b mounted on the vehicle 110 (FIG. 1A) relative to the projection 300 for the purposes of calibration. As depicted in FIG. 5, the projection 300 is located within a first field of view 502 of the first forward imaging device 116a and within a second field of view 504 of the second forward imaging device 116b such that images obtained by the first forward imaging device 116a and the second forward imaging device 116b contain the projection 300. The calibration algorithm used to calibrate the first forward imaging device 116a and/or the second forward imaging device 116b may utilize the projection 300 from the image data to determine the orientation of the first forward imaging device 116a and/or the second forward imaging device 116b (including a relative orientation of the first forward imaging device 116a to the second forward imaging device 116b, any other imaging devices, and/or the vehicle), and may adjust the parameters of the first forward imaging device 116a and/or the second forward imaging device 116b (e.g., aim of the first forward imaging device 116a and/or the second forward imaging device 116b, focus of the first forward imaging device 116a and/or the second forward imaging device 116b, and/or the like) accordingly. As noted hereinabove, such calibration algorithms are well understood and are not discussed in further detail.

Figure 6:
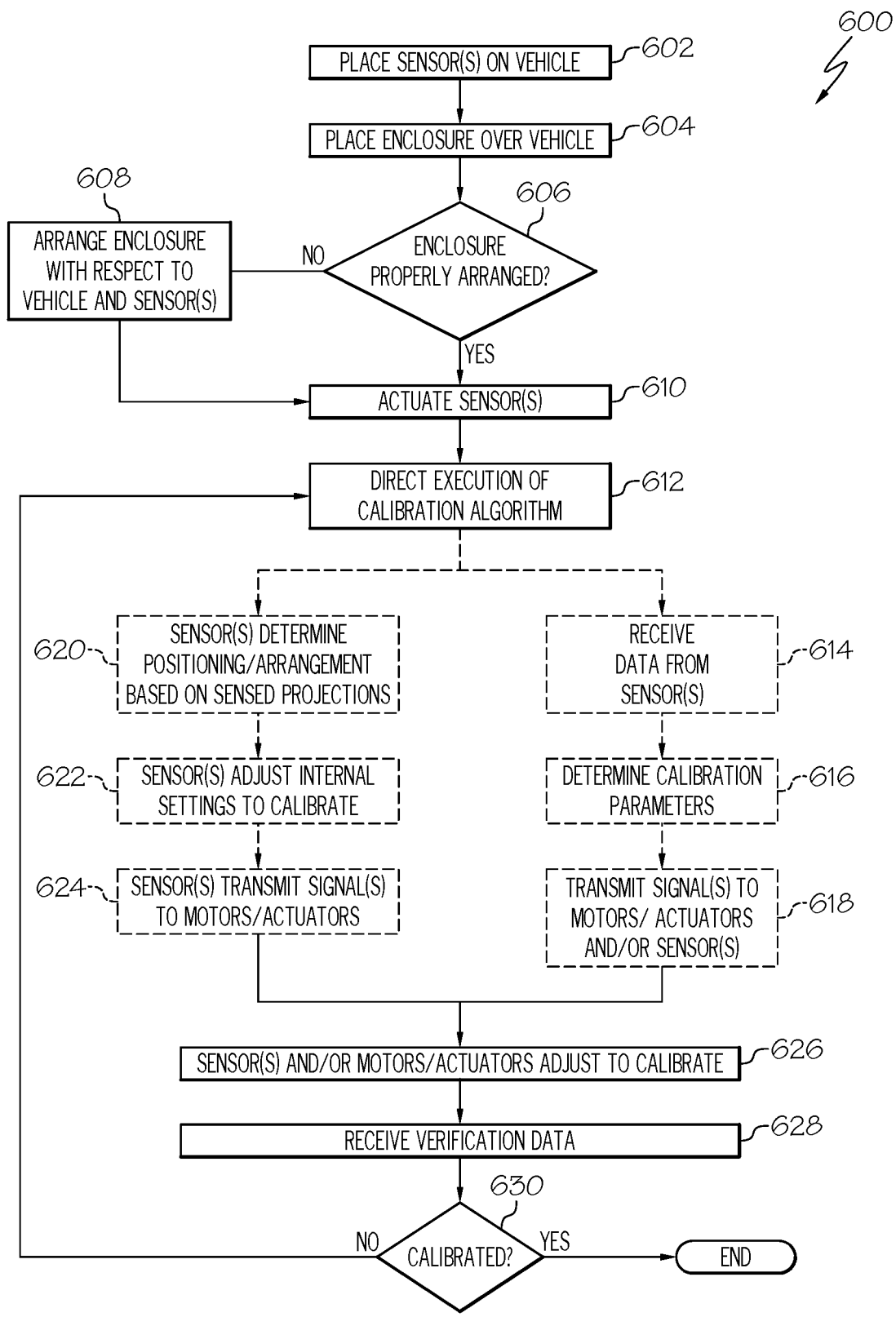
FIG. 6 depicts a flow diagram of an illustrative method of calibrating one or more vehicle sensors using a sensor calibration enclosure according to one or more embodiments shown and described herein.

FIG. 6 depicts a flow diagram of an illustrative method, generally designated 600, of calibrating one or more vehicle sensors using the various enclosures described herein. Referring to FIGS. 1A-1B, 2, and 6, the method includes placing one or more of the plurality of sensors 112 on the vehicle 110 at block 602. This may include placing a previously removed sensor that has been cleaned or repaired, placing a new sensor in the place of an old sensor, cleaning or repairing a sensor without removing the sensor from the vehicle such that it is ready for calibration, adding a new sensor to a location on the vehicle 110 that previously did not have a sensor, and/or the like. Once the sensors are placed, the enclosure (e.g., the hard enclosure 100 or the soft enclosure 100') is placed over the vehicle at block 604. Placement may include, for example, actuating a hoist or a lift to move the enclosure over the vehicle 110, manually lifting and placing the enclosure over the vehicle 110, sliding the enclosure around the vehicle 110, driving the vehicle 110 into the enclosure and closing a door or wall behind the vehicle 110, and/or the like.

At block 606, a determination may be made as to whether the enclosure is properly arranged with respect to the vehicle 110 and/or one or more of the plurality of sensors 112 thereon. If the enclosure is not properly arranged, the process may proceed to block 608. If the enclosure is properly arranged, the process may proceed to block 610. Determining whether the enclosure is properly arranged may include, for example, visually inspecting the enclosure for alignment with the vehicle 110 (e.g., inspecting any lines, symbols, images, or the like on the enclosure are aligned with various lines, features, or the like on the vehicle 110), visually inspecting for alignment of the various dimensional aspects and/or features of the enclosure with the corresponding dimensional aspects and/or features of the vehicle 110, determining whether the enclosure is attached to the vehicle 110 at particular attachment points, utilizing a video feed or the like from one or more of the sensors 112 to determine alignment, and/or the like.

At block 608, the enclosure (e.g., the hard enclosure 100 or the soft enclosure 100') is arranged with respect to the vehicle 110 and the plurality of sensors 112. In some embodiments, such an arrangement may include aligning one or more lines, images, patterns, and/or the like on the enclosure with a corresponding line, image, pattern, seam, vehicle component, or the like on the vehicle 110. In some embodiments, such an arrangement may include attaching one or more attachment mechanisms on the enclosure to the vehicle 110 (e.g., snapping snaps, attaching hooks, coupling hook and loop fastener components, applying adhesive strips, and/or the like). Once the enclosure is appropriately arranged, the process proceeds to block 610.

At block 610, the plurality of sensors 112 on the vehicle 110 are actuated. That is, a signal is transmitted to the vehicle 110 and/or to the sensors 112 to direct actuation of the sensors such that calibration can occur. As a result of actuation of the sensors 112, the sensors 112 may sense information pertaining to the projection 300, such as, for example, the visual characteristics of the projection 300 described herein, a particularly encoded signal transmitted via radio waves, a particular sound, and/or the like. At block 612, execution of a calibration algorithm is directed. That is, the vehicle 110 or one or more components thereon or therein (e.g., an electronic control unit (ECU) or the like) may be directed to execute a software algorithm or the like that contains a calibration process. In some embodiments, one or more of the plurality of sensors 112 may be equipped with processing hardware that allows the sensor to self-calibrate by executing a pre-installed calibration algorithm. In such embodiments, the sensor may be directed to execute the pre-installed calibration algorithm by transmitting a signal to the sensor or otherwise causing the sensor to begin calibration.

Certain sensors may be capable of self-calibrating by self-adjusting settings, directing movement of the sensors (e.g., causing one or more actuators to actuate, etc.), and/or the like. Other sensors may not be capable of self-calibrating and may have to be manually calibrated (or may have one or more components that are actuated to cause calibration). As the present disclosure allows for calibration for either type of sensor, a different process may be followed. That is, the process according to block 620, block 622, and block 624 may be completed by self-calibrating sensors and the process according to block 614, block 616, and block 618 may be completed for non-self-calibrating sensors. As such, the method 600 may continue from block 612 to block 614 or block 620 depending on the type of sensor being calibrated.

At block 614, data is received from the sensors 112. The data may be received by a computing device communicatively coupled to the vehicle 110 or may be received by one or more vehicle computing devices, such as an electronic control unit (ECU) or the like. In some embodiments, the data from the sensors 112 is received via any communications protocol, including wired and wireless communications protocols. In a particular embodiment, the data from the sensors 112 may be received via a vehicle bus that interconnects the sensors to one or more vehicle computing devices, such as, for example, a controller area network (CAN) bus or the like. The data that is received generally corresponds to data that is collected as a result of operation of the sensors 112 with respect to the projection 300. That is, as the sensors 112 are actuated and collect data from an area surrounding the sensors 112 (including the projection 300), the resulting collected data is then transmitted according to block 614 for the purposes of determining calibration.

The one or more devices that receive the data from the sensors 112 may then determine various calibration parameters at block 616. In one aspect, such a determination may include execution of a calibration algorithm that compares the data received from the sensors 112 with reference data contained within a database, determines a difference between the received data and the reference data, and determines one or more adjustments that would result in a reduction or elimination of the difference. Adjustments may include moving a physical location of a sensor 112, adjusting an aim of a sensor 112, adjusting a focus of a sensor 112, adjusting a white balance of a sensor 112, and/or the like. Other adjustments should generally be understood. Further, the calibration algorithm utilized is not limited by the present disclosure, and may generally be any calibration algorithm now known or later developed.

Once the calibration parameters have been determined according to block 616, one or more signals may be transmitted at block 618 to the sensors 112 and/or one or more components coupled to the sensors 112 that are adapted to alter sensor parameters, such as, for example, one or more motors, one or more actuators, and/or the like. The one or more signals may generally be transmitted via a data connection (e.g., a wired or a wireless connection) between the device completing the processes according to blocks 614-

618 and the one or more sensors 112 and/or the one or more components coupled to the sensors 112.

At block 620, each of the self-calibrating sensors 112 may generally determine its arrangement, positioning, and/or the like based on one or more sensed projections. That is, the data collected by each of the one or more sensors 112 may be used by the one or more sensors 112 to determine arrangement, positioning, and/or the like. At block 622, the one or more sensors 112 may adjust one or more internal settings (e.g., focus, white balance, and/or the like) and/or may transmit one or more signals to one or more components external to the sensor 112 that adjust sensor parameters, such as motors, actuators, and/or that like, at block 624.

Regardless of whether self-calibrating sensors 112 or non-self-calibrating sensors 112 are used, the process continues from block 618 or block 624 at block 626. At block 626, the one or more sensors 112 and/or the one or more components connected to the sensors 112 (e.g., motors, actuators, and/or the like), adjust according to the generated signals. That is, the one or more sensors 112 and/or the one or more components coupled to the sensors move and/or adjust one or more operating parameters in accordance with one or more calibration signals that are received to calibrate the one or more sensors 112 for use.

At block 628, verification data may be received, which is then used to make a determination at block 630 as to whether the one or more sensors 112 are calibrated and ready for use. The verification data is generally not limited by the present disclosure, and may include additional sensed data received from the one or more sensors 112, the additional sensed data including the projection 300 on the interior surface 104 of the enclosure 100, 100' that can be compared at block 630 to reference data to determine whether each of the one or more sensors 112 is calibrated (e.g., by determining whether the additional sensed data matches the reference data). If each of the one or more sensors 112 is calibrated, the process may end and the enclosure 100, 100' can be removed such that it no longer covers the vehicle 110. If one or more of the sensors 112 is still not calibrated, the process may return to block 612 to repeat various steps to calibrate the non-calibrated sensor(s) 112.

It should now be understood that the enclosures described herein include an interior surface having one or more projections thereon. The one or more projections usable by one or more vehicle sensors for the purposes of calibration when the enclosure is placed over a vehicle and particularly aligned with respect to the vehicle. The enclosures described herein may be hard enclosures constructed from a rigid material that does not conform to a shape of a vehicle or may be soft enclosures constructed from a pliable material that conforms to a shape of a vehicle. In some embodiments, the enclosures may be formed to correspond in shape and/or size of a particular vehicle. In other embodiments, the enclosures may be formed such that they fit over a vehicle in a certain manner, but do not necessarily correspond in shape and/or size of a particular vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A calibration enclosure, comprising:
a body comprising an interior surface; and
one or more projections disposed at one or more locations on the interior surface of the body, each one of the one or more projections providing an encoded signal that is usable for calibrating a vehicle sensor when the calibration enclosure is placed over a vehicle comprising the vehicle sensor such that the calibration enclosure covers the vehicle.

2. The calibration enclosure of claim 1, wherein at least one of one of the one or more projections is particularly positioned with respect to the vehicle sensor when the calibration enclosure is arranged with respect to the vehicle.

3. The calibration enclosure of claim 1, wherein at least one of the one or more projections is a static projection.

4. The calibration enclosure of claim 1, wherein at least one of the one or more projections is a dynamic projection.

5. The calibration enclosure of claim 4, wherein the dynamic projection is communicatively coupled to the vehicle sensor such that one or more signals are transmitted by the vehicle sensor to cause the dynamic projection to change.

6. The calibration enclosure of claim 1, wherein at least one of the one or more projections comprises a plurality of shapes arranged in a particular manner that is recognizable by a software algorithm for the purposes of calibration.

7. The calibration enclosure of claim 1, wherein the body is constructed of a rigid material.

8. The calibration enclosure of claim 1, wherein the body is constructed of a pliable material.

9. The calibration enclosure of claim 1, wherein the body is shaped and sized to correspond to a shape and a size of a particular vehicle.

10. The calibration enclosure of claim 1, wherein the body is shaped and sized to correspond to a shape and size of a particular class of vehicle.

11. The calibration enclosure of claim 1, wherein the body is shaped and sized to correspond to a shape and size of a plurality of vehicle types.

12. The calibration enclosure of claim 1, wherein the body defines a cavity that receives the vehicle when the calibration enclosure is placed over the vehicle.

13. The calibration enclosure of claim 1, wherein the body further comprises one or more alignment features that provide an indicator of alignment with the vehicle when the calibration enclosure is placed over the vehicle.

14. A system for calibrating one or more vehicle sensors, the system comprising:
a calibration enclosure, the calibration enclosure comprising one or more projections disposed at one or more locations on the calibration enclosure, each one of the one or more projections providing an encoded signal that is usable for calibrating at least one of the one or more vehicle sensors when the calibration enclosure is placed over a vehicle comprising the one or more vehicle sensors such that the calibration enclosure covers the vehicle.

15. The system of claim 14, wherein at least one of one of the one or more projections is particularly positioned with respect to at least one of the one or more vehicle sensors when the calibration enclosure is arranged with respect to the vehicle.

16. The system of claim 14, wherein at least one of the one or more projections is a static projection.

17. The system of claim 14, wherein at least one of the one or more projections is a dynamic projection.

18. The system of claim 17, wherein the dynamic projection is communicatively coupled to at least one of the one or more vehicle sensors such that one or more signals are transmitted by the at least one vehicle sensor to cause the dynamic projection to change.

19. A method of calibrating at least one vehicle sensor disposed on a vehicle, the method comprising:
   placing a calibration enclosure over the vehicle such that the calibration enclosure covers the vehicle, the calibration enclosure comprising an interior surface having one or more projections disposed at one or more locations on the interior surface, each one of the one or more projections providing an encoded signal that is usable for calibrating the at least one vehicle sensor; and
   executing at least one calibration algorithm, the at least one calibration algorithm using data obtained from at least one of the one or more projections to calibrate the at least one vehicle sensor.

20. The method of claim 19, further comprising:
   aligning the calibration enclosure with the vehicle.

\* \* \* \* \*